United States Patent
Watanabe

(10) Patent No.: US 8,090,024 B2
(45) Date of Patent: Jan. 3, 2012

(54) METHODS FOR PROCESSING TWO DATA FRAMES WITH SCALABLE DATA UTILIZATION

(75) Inventor: Hitoshi Watanabe, San Jose, CA (US)

(73) Assignee: Sigma Designs, Inc., Milpitas, CA (US)

( * ) Notice: Subject to any disclaimer, the term of this patent is extended or adjusted under 35 U.S.C. 154(b) by 1226 days.

(21) Appl. No.: 11/768,163

(22) Filed: Jun. 25, 2007

(65) Prior Publication Data

US 2008/0317057 A1 Dec. 25, 2008

(51) Int. Cl.
*H04N 7/36* (2006.01)
*H04B 1/66* (2006.01)
*H04N 11/02* (2006.01)

(52) U.S. Cl. .................................. 375/240.16
(58) Field of Classification Search ............... 375/240.16
See application file for complete search history.

(56) References Cited

U.S. PATENT DOCUMENTS

| | | | | |
|---|---|---|---|---|
| 6,128,047 A * | 10/2000 | Chang et al. | ............... | 348/699 |
| 6,335,950 B1 * | 1/2002 | Kohn | ............... | 375/240.16 |
| 6,430,223 B1 * | 8/2002 | Lim | ............... | 375/240.16 |
| 6,690,730 B2 * | 2/2004 | Choi | ............... | 375/240.16 |
| 6,895,361 B2 * | 5/2005 | Yang | ............... | 702/179 |
| 7,042,512 B2 * | 5/2006 | Yang et al. | ............... | 348/452 |
| 7,126,991 B1 * | 10/2006 | Mimar | ............... | 375/240.16 |
| 7,319,491 B2 * | 1/2008 | Matsuzaki et al. | ............... | 348/452 |
| 7,356,439 B2 * | 4/2008 | Jung | ............... | 702/150 |
| 2001/0011326 A1 * | 8/2001 | Yoshikawa et al. | ............... | 711/119 |
| 2005/0013368 A1 * | 1/2005 | Gallant et al. | ............... | 375/240.16 |

OTHER PUBLICATIONS

Flierl, Markus et al. "Rate-Constrained Multihypothesis Prediction for Motion Compensated Video Compression", Jun. 2002.*
Chen, Tung-Chien et al. "Single Reference Frame Multiple Current Macroblocks Scheme for Multiple Reference Frame Motion Estimation in H.264/AVC", Feb. 2007.*
Tanskanen, Jarno K. et al. "Byte and Modulo Addressable Parallel Memory Architecture for Video Coding", Nov. 2004.*
Yang, Shengqi et al. "Power and Performance Analysis of Motion Estimation Based on Hardware and Software Realizations", Jun. 2005.*

* cited by examiner

*Primary Examiner* — Michael Simitoski
(74) *Attorney, Agent, or Firm* — Aaron Wininger; Perkins Coie LLP

(57) ABSTRACT

The present invention provides a framework for the processing of blocks between two data frames and in particular application to motion estimation calculations in which a balance among the performance of a motion search algorithm, the size of on-chip memory to store the reference data, and the required data transfer bandwidth between on-chip and external memory can be optimized in a scalable manner, such that the total system cost with hierarchical embedded memory structure can be optimized in a flexible manner. The scope of the present invention is not limited to digital video encoding in which motion vector is part of information to be encoded, but is applicable to any other implementation in which difference between any two data frames are to be computed.

19 Claims, 11 Drawing Sheets

Figure 1
(Prior Art)

METHODS FOR PROCESSING TWO DATA FRAMES WITH SCALABLE DATA UTILIZATION

FIELD OF INVENTION

The present invention relates to methods for comparing two data frames and, in particular, relates to the processing of two data frames to compute motion estimation between the two data frames.

BACKGROUND

Motion matching is a scheme to investigate an image flow between two pictures, and in the case of digital video compression, it takes advantage of temporal redundancy of digital video data and constitutes a valuable portion of digital video encoding algorithm. Since motion matching algorithms compare raw data against reference data and searches for the best matching location, its performance generally depends on the size of the search area ("motion search range" or "MSR") and a more robust performance will require a larger motion search range. However, a larger motion search range typically leads to a higher amount of computation and requires larger memory size as well as larger memory transfer bandwidth. This implementation cost overhead will generally increase significantly as picture resolution increases, from QSIF to SIF/QVGA to VGA/D1 to HD. This presents serious technical challenges to efficiently implement motion search algorithms, particularly for cost and power sensitive consumer applications.

For example, referring to FIG. 1, in the processing of two frames of data, for example for motion estimation in video applications, a current frame 104 is compared against a reference frame 102, where each frame may be divided into a number of macroblocks ("MB"). Each MB of the current frame would be compared against each MB of the reference frame 102. In the most general sense, the first MB 106 of the current frame 104 would be compared against the reference frame 102 at all pixel locations. This process would require a significant amount of computational power as well as a large amount of memory throughput.

In a better prior art technology method in the processing of the data frames, referring to FIG. 2, a MB 202 would be selected from the current frame 104 and its corresponding MSR is designated as 206 of the reference frame 102. MB 202 is then compared and matched against MSR at all data points within MSR, and the best matching point based on a predetermined cost function will be identified. For the purpose of this disclosure, the details of the cost function are irrelevant and the determination of such function is outside the scope of this disclosure. In comparing the current frame against the reference frame, the MBs are processed in a left to right, top to down sweeping order as designated on 104. Therefore, in such processing as for motion estimation, prior to processing of a new MB, its corresponding MSR is designated and the pixel data inside such MSR needs to be prepared. Such processing would require the loading and reloading of these neighboring MBs of the block 206 every time a row of data is processed. The reloading of the MBs requires memory bandwidth which is a relatively power-consuming subprocess when compared to other processes and is a bottleneck in the processing of the data frames.

Therefore, it is desirable to have novel methods in the processing of two data frames where a first data frame is processed against a second data frame in applications such as motion estimation and other relevant applications.

SUMMARY OF THE INVENTION

An object of the present invention is to provide methods for comparing a first data frame and a second data frame using an addressable data block ("ADB") of certain size and shape and included therein a motion search range ("MSR") of certain size and shape.

Another object of the present invention is to provide methods that process MBs in certain designated order to minimize the need to repeatedly retrieve data from external memory.

Still another object of the present invention is to provide methods that can be customized to the size of internal memory to optimize processing of MBs.

The present invention provides a framework for the processing of data blocks of two data frames for, in one application, motion estimation calculations in which a balance among the performance of a motion search algorithm, the size of on-chip memory to store the reference picture data, and a required data transfer bandwidth between on-chip and external memory can be optimized in a scalable manner, such that the total system cost with hierarchical embedded memory structure can be optimized in a flexible manner. The scope of the present invention is not limited to digital video encoding in which motion vector is part of information to be encoded, but is applicable to any implementation in which difference between any two data frames are to be computed.

An advantage of the present invention is that it provides methods for comparing a first data frame and a second data frame using an addressable data block of certain size and shape and included therein a motion search range of certain size and shape.

Another advantage of the present invention is that it provides methods that process MBs in certain designated order to minimize the need to repeatedly retrieve data from external memory.

Still another advantage of the present invention is that it provides methods that can be customized to the size of internal memory to optimize processing of MBs.

BRIEF DESCRIPTION OF THE DRAWINGS

The following are further descriptions of the embodiments of the invention with references to figures and examples of their applications.

Figure 1:
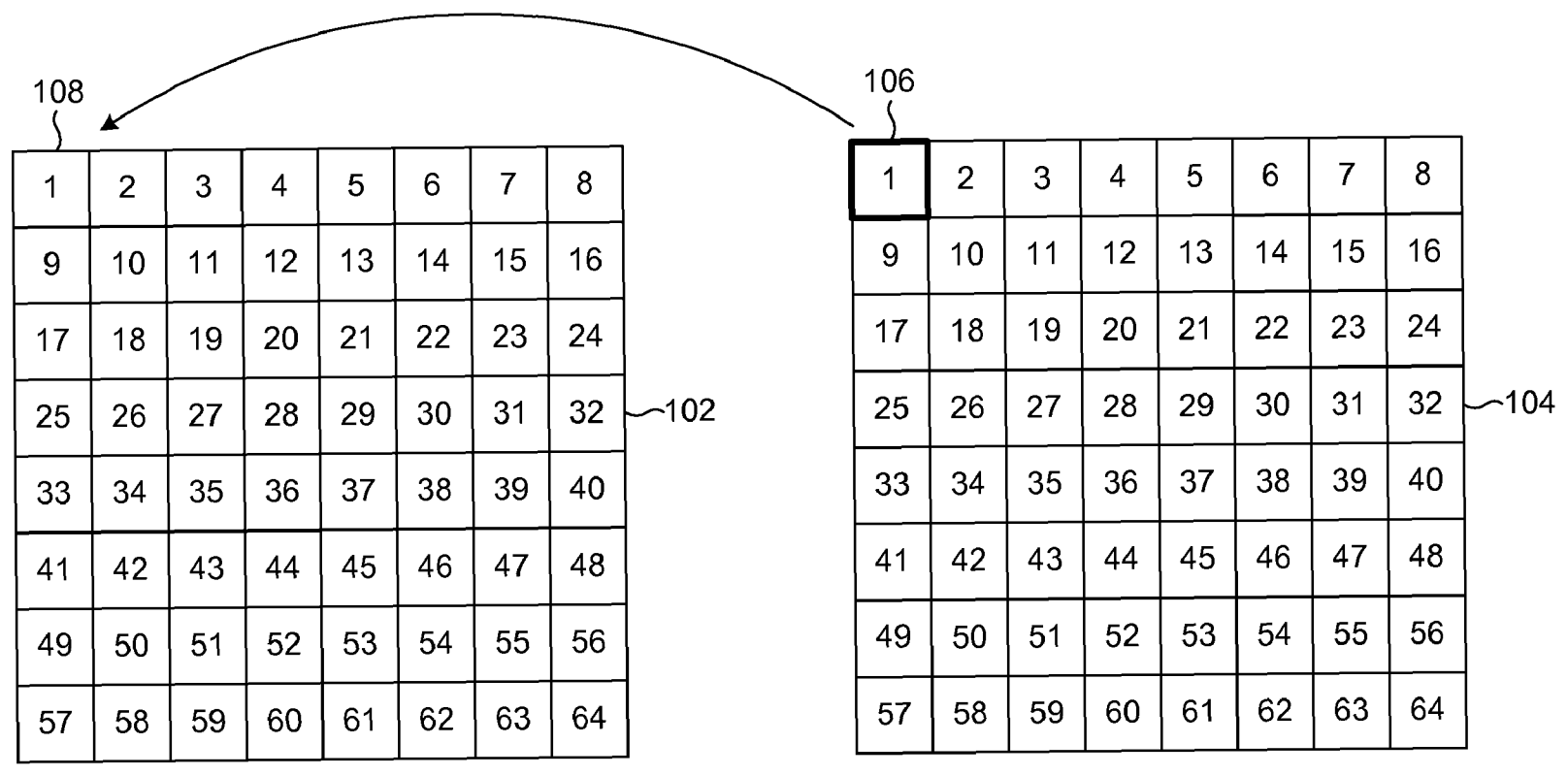

FIG. 1 illustrates a prior art motion estimation method between a reference frame and a current frame;

DETAILED DESCRIPTION OF THE PREFERRED EMBODIMENTS

The present invention provides a framework to implement the processing of two data frames for many relevant applications. For example, in a motion matching engine, a balance is designed in consideration of the following factors: the size of on-chip memory (in the CPU, DSP or ASIC) to store reference data blocks, the required data transfer bandwidth between on-chip and external memory, the performance of the applicable algorithm (such as the motion estimation algorithm), and, in the case of digital video encoding, coding performance. These factors can be optimized in a scalable manner such that a total system cost/performance tradeoff with hierarchical embedded memory structure can be optimized in a flexible manner.

In the presently preferred embodiment of the present invention, there are two basic features. The first feature is to separate the definition of the reference data loaded onto on-chip memory and that of the data in the motion search range, and the second feature is the processing of the MBs in a flexible manner.

The reference data read into on-chip memory are typically the same as that in the motion search range ("MSR"), in order to maximally utilize the reference data available on chip. However, defining the two data blocks separately allows better utilization of the on-chip memory size and allows data transfer in a more flexible manner and optimizes a balance between the two in a scalable manner. In addition to the memory size as well as data transfer bandwidth, the order in processing the MB affects video coding efficiency mainly through available neighboring MB information. Most video coding scheme typically utilizes coding information of neighboring MBs, such as final motion vector and final mode decision to construct prediction values. Therefore, if more information of neighboring MB is available, the coding efficiency will be generally improved. Which MBs are available for construction of prediction for the presently processed MB depends on the features such as pipeline structure of encoding engine as well as the scanning pattern of MBs. Below, some examples of interest are described.

Figure 2:
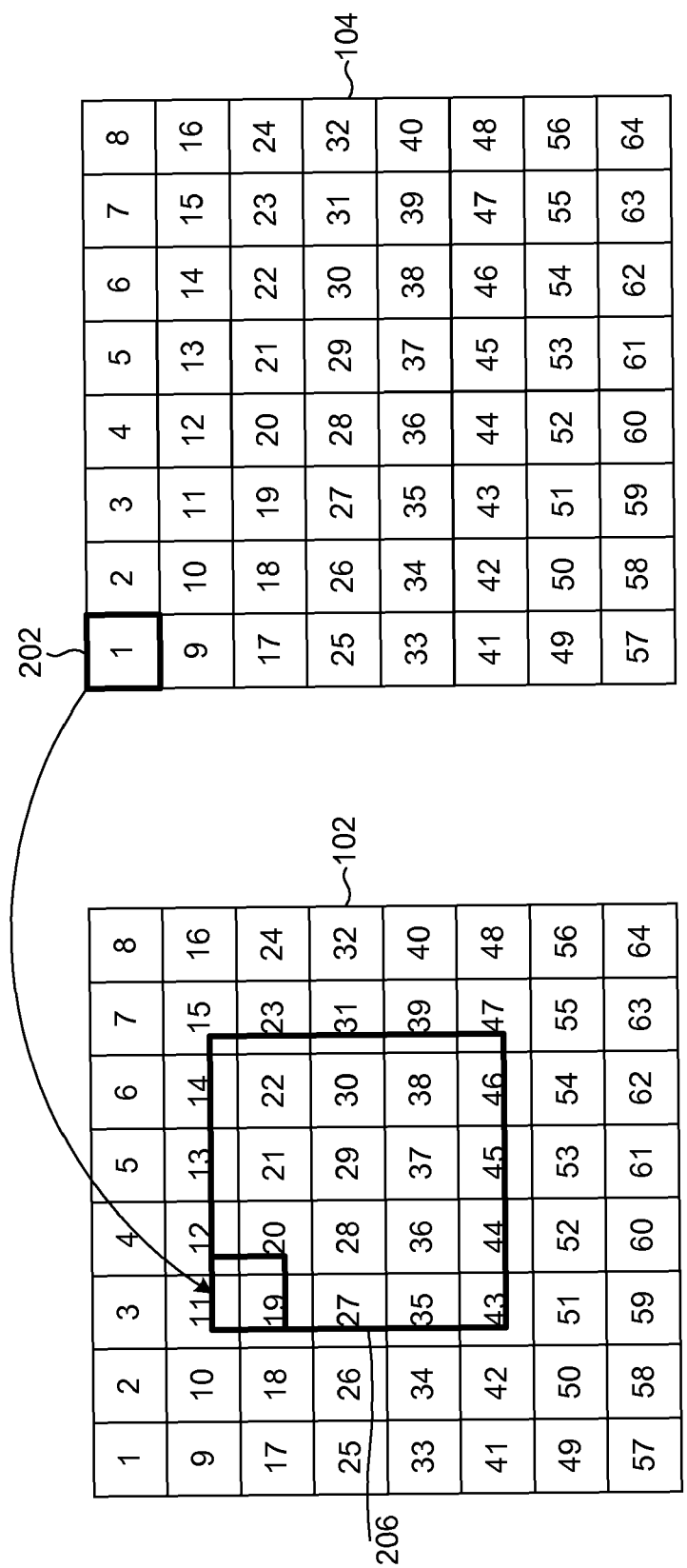
FIG. 2 illustrates a prior art motion estimation method between a reference frame and a current frame where the MSR is a block of MBs.
Figure 3:
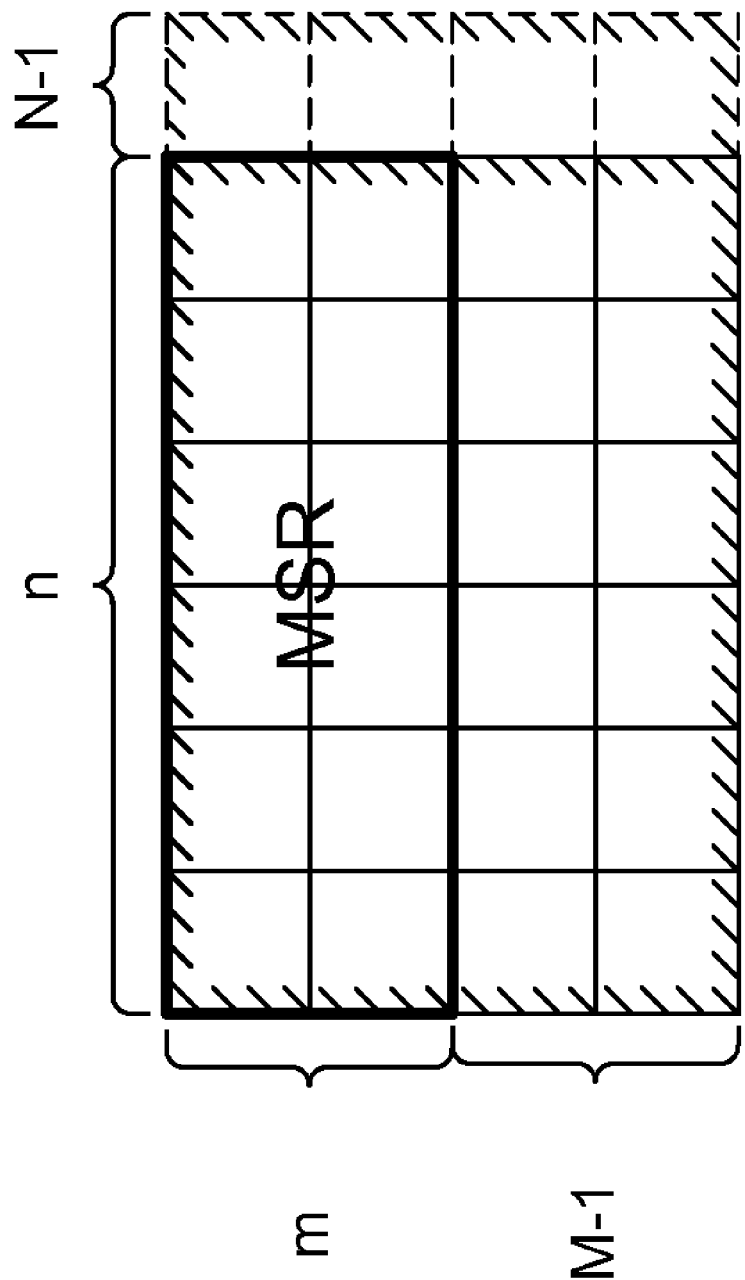
FIG. 3 illustrates one design of an ADB and MSR therein.

In a presently preferred embodiment for an addressable data block ("ADB"), referring to FIG. 3, the size of the motion search range (or "MSR") is set to a size of m by n. Let M and N be such that additional numbers of MBs to load into ADB beyond MSR are M−1 in the vertical direction and N−1 in the horizontal direction, respectively. The working size of addressable data block (or ADB) read into any on-chip memory is then (M−1+m) and (N−1+n).

Let us define:

$Mo = M-1+m$ $No = N-1+n$

Then, Mo by No can roughly scale with the size of on-chip memory, with m by n MSR scaling with the performance of motion estimation. Therefore, in case of video encoding such as MPEG standards, the size of the MSR (m*n) influences the coding performance, and M inversely scales with reference data transfer bandwidth. In the case of digital video encoding where the encoding order of MB is in raster scan order, M, N and the encoding order of MBs will also influence coding efficiency and generally larger N will result in better coding efficiency. Therefore, by changing M, m, N, and n, it is possible to balance the tradeoff among factors such as coding performance, on-chip memory size, and memory bandwidth and throughput requirements for data transfer.

Figure 4:
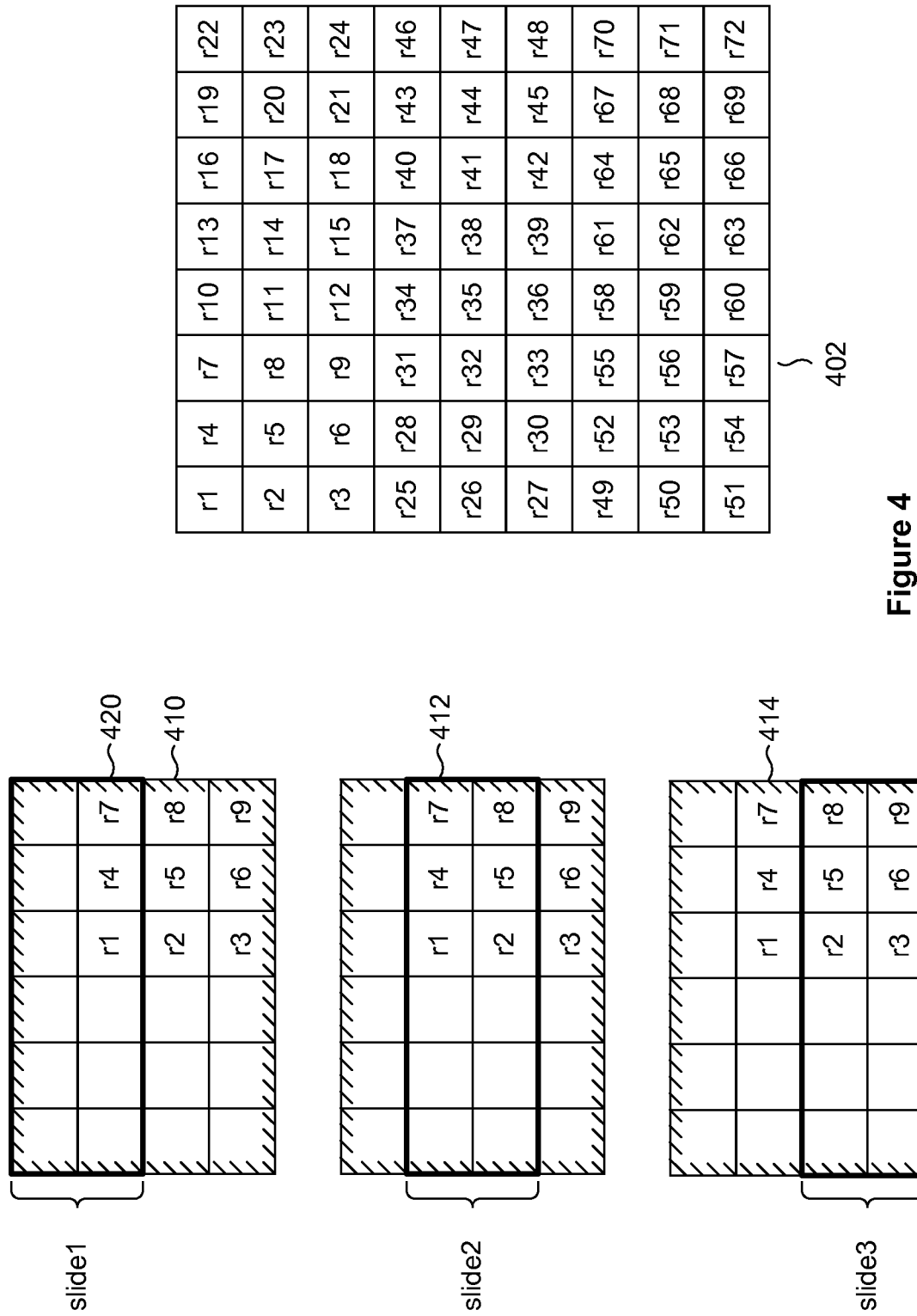
FIG. 4 illustrates an example utilizing a preferred embodiment of the present invention using a MSR of certain size and shape and processing the MBs in the order as illustrated.

As an example, FIG. 4 illustrates a scenario where the MSR is m (equaling 2) by n (equaling 6), and additional MBs to be loaded into the ADB in the vertical direction is M−1 rows (here with M equaling 3), and that in the horizontal direction is N−1 columns (here with N equaling 1), resulting in the addressable data block (ADB) 410 being a 4×6 block (m+M−1=2+3−1=4, and n+N−1=6+1−1=6). The MBs of the reference frame is labeled in a particular order as illustrated 402.

The MBs from the reference frame are loaded into the ADB to be processed against the MBs of the current frame. The MBs of the reference frame can be loaded in to the ADB in a variety of manners. Here, as is illustrated, the MBs of the reference frame are loaded into the ADB where MBs r1-r9 are loaded.

Note that at this time, the MB of current frame to be processed is loaded in memory and the reference MBs (r1-r9) are loaded into memory as well. MB in the current frame is processed against the selected areas of the MBs (inside ADB) of the reference frame in the application of choice, for example, motion estimation. Only MBs that are needed are loaded into memory and, as described above, they are loaded in manner to minimize memory requests and therefore minimizing memory throughput.

Further note that the reference frame MBs that are selected to process is first defined. Processing does not need to start with the first MB of the reference frame; it could start with a selected MB of the reference frame. The starting location again depends on the application. For motion estimation, an area of interest between the reference frame and the current frame would be identified first and the starting locations would then be decided accordingly. That area would be overlaid by the ADB.

Once the desired ADB is defined and MBs of the reference frame are loaded, the current MB is processed, starting with slide1 as illustrated by FIG. 4. The first current MB located at r1 on the current frame is compared against the data inside slide1 consisting of r1, r4, and r7. Since the first MB is at the frame boundary, there are no neighboring MBs on one side. Once the current MB is processed against slide1, a current MB is shifted down to the location of r2 on the current frame and the MSR is moved (or re-defined) as indicated by slide2. There, the current MB is compared against slide2 consisting of r1, r4, r7, r2, r5, and r8. Next, the current MB is moved to location r3 and the MSR is moved as indicated by slide3. Similarly, the current MB is processed and compared against the reference data within slide3 consisting of r2, r5, r8, r3, r6, and r9.

Figure 5A:
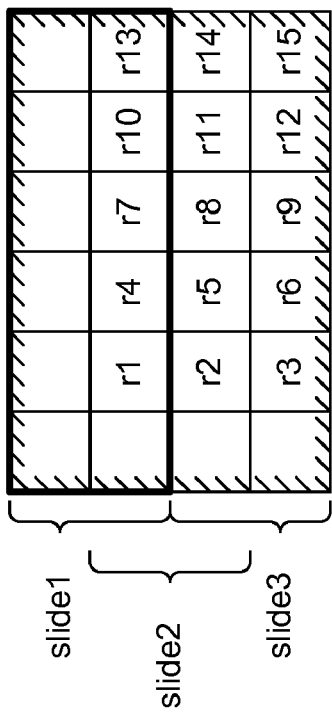
FIGS. 5A-5j illustrate an example in processing MBs utilizing a preferred embodiment of the present invention, and in particular utilizing a MSR of certain size and shape and processing the MBs in the order as illustrated.
Figure 5C:
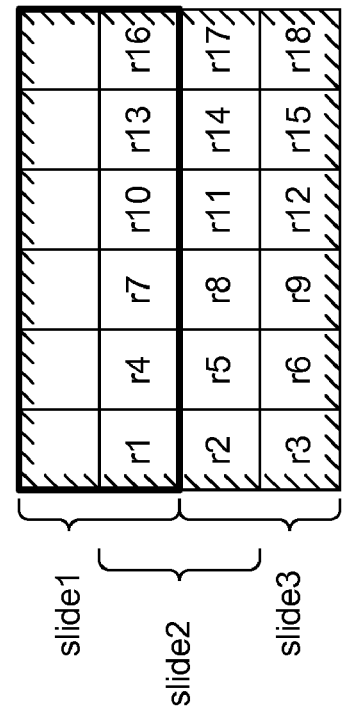
Figure 5B:
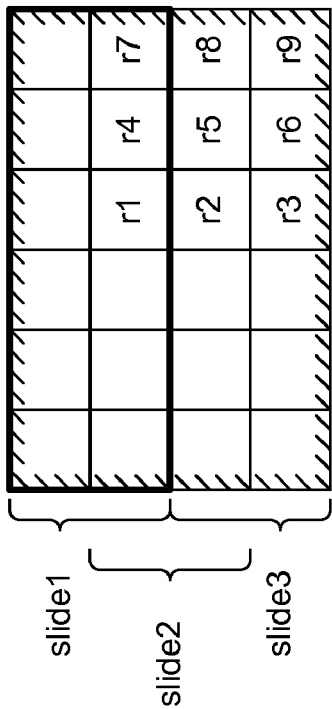
Figure 5D:
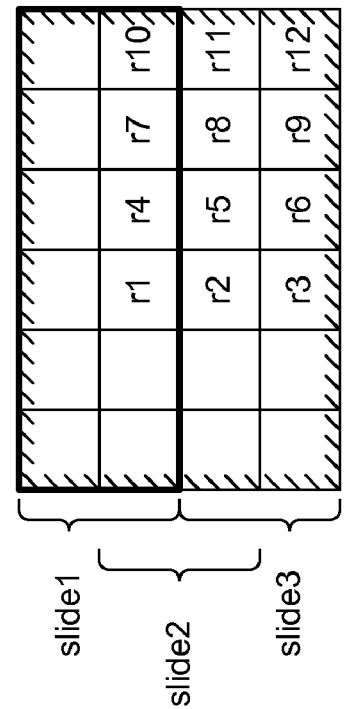

Referring to FIG. 5A, this is the case as explained above where reference MBs r1 to r9 are loaded and the MSR is processed and slid (or re-defined) from slide1 to slide2 and to slide 3. The process continues, referring to FIG. 5B, where the existing MBs of the reference frame, r1-r9, are shifted over by one MB and MBs r10 to r12 are loaded into the ADB. The current MB is also shifted to location r4 on the current frame. MSR slide1 is first processed where the current MB is processed against slide1 consisting of r1, r3, r7, and r10. Next, the current MB is shifted to location r5 and processed against slide2 consisting of MBs r1, r4, r7, r10, r2, r5, r8, and r11. Then, the current MB is shifted to location r6 and processed against slide 3 consisting of MBs r2, r5, r8, r11, r3, r6, r9, and r12. This process continues where additional MBs of the reference frame are loaded and processed (see FIG. 5C, FIG.

Figure 5E:
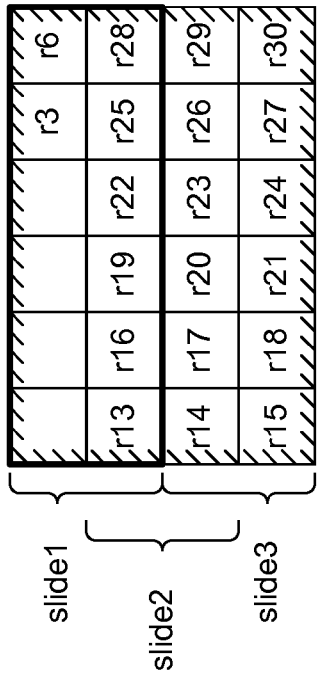
Figure 5F:
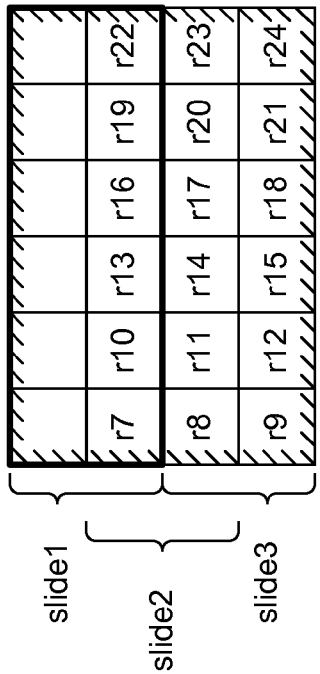

5D, and FIG. 5E). When the end of the rows of the reference frame is reached (see FIG. 5E), in the next load, see FIG. 5F, the beginning MBs of the next rows (r25, r26, and r27) and the boundary MB (r3) are loaded. These MBs are loaded in preparation to process the next rows.

Figure 5G:
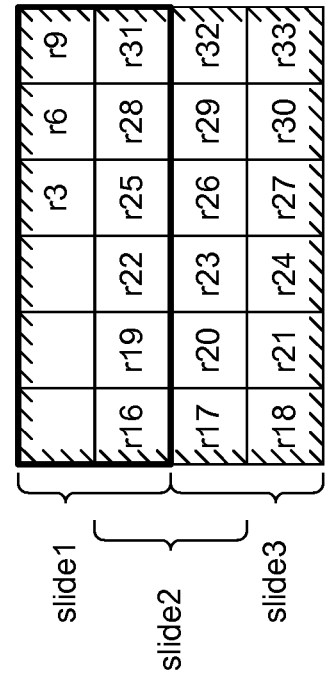

In processing these end of row MBs, only the end of row reference MB data are utilized. For example, in FIG. 5F, with MSR slide1 and current MB at location r19, MBs r10, r13, r16, r19, and r22 are utilized to compare against the current MB. With MSR slide2 and current MB at location r20, MBs r10, r13, r16, r19, r22, r11, r14, r17, r20, and r23 are utilized; and with MSR slide3 and current MB at location r21, MBs r11, r14, r17, r20, r23, r12, r15, r18, r21, and r24 are utilized. Note that MBs r3, r25, r26, and r27 are not utilized. The process continues until all MBs on the same row are processed, see FIG. 5G.

Figure 5H:
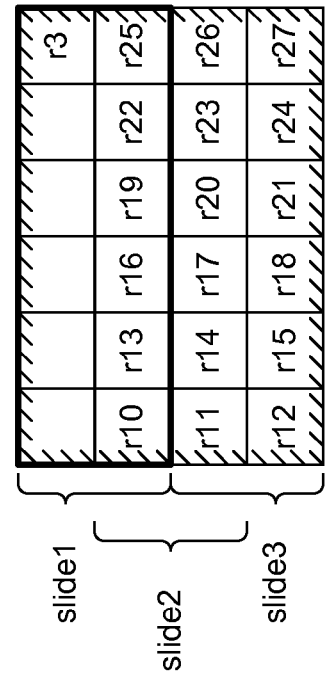
Figure 5J:
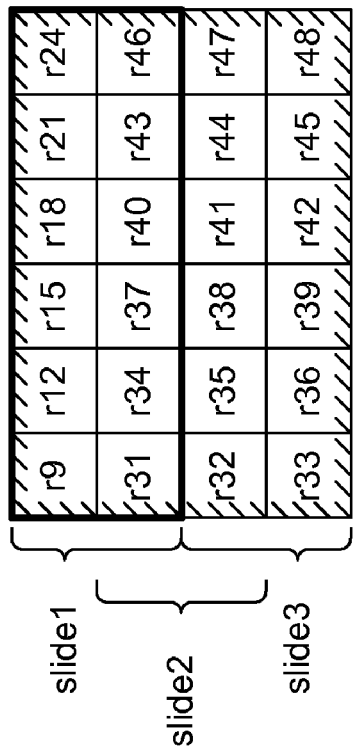
Figure 5I:
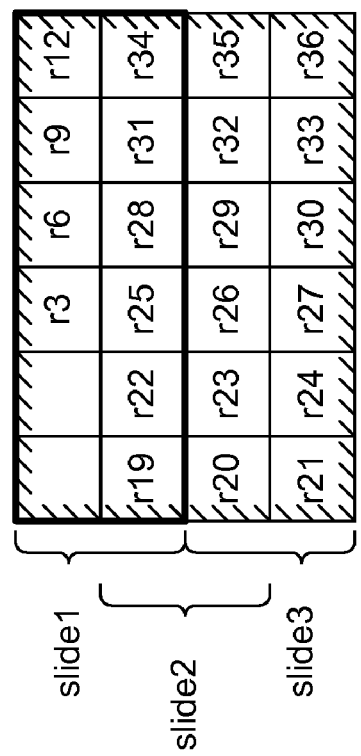

When the ends of the rows are finished, the next rows are processed. Referring to FIG. 5H, with MSR slide1 and current MB at location r25, MBs r3, r6, r9, r25, r28, and r31 are utilized. With MSR slide2 and current MB at location r26, MBs r25, r28, r31, r26, r29, and r32 are utilized. MSR slide3 is processed in likewise manner. This process continues, see FIG. 5I. This process repeats and continues until end of the frame is reached, see FIG. 5J.

Figure 6:
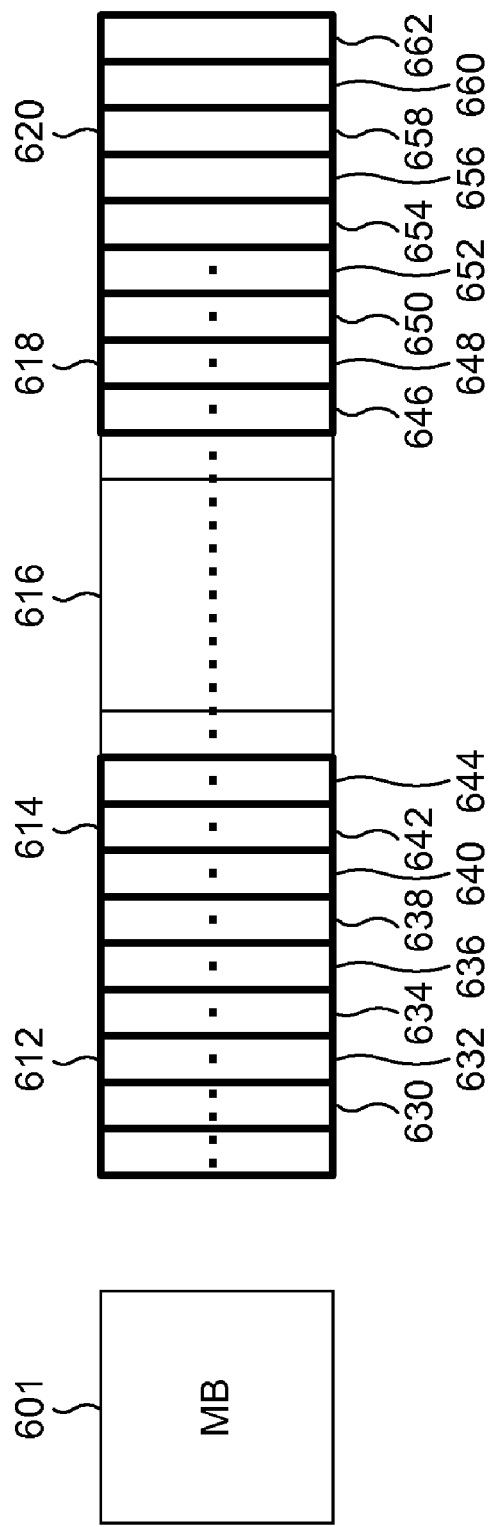
FIG. 6 illustrates the processing of MB data at the pixel level between the current frame data and reference frame data.

Note that, referring to FIG. 6, in the processing of MBs (showing 601 and reproduced as 612, 614, 616, 618, and 620), it is typically done pixel by pixel from one column of pixels to the next column of pixels until the end of the row is reached (630 to 660). Then, the next row of pixels is processed, again from one column to the next column for this row. This process continues until all pixels of all rows and columns are processed. That is why it is such a computationally intensive task and efficiency in loading data and processing data is high priority.

Figure 7:
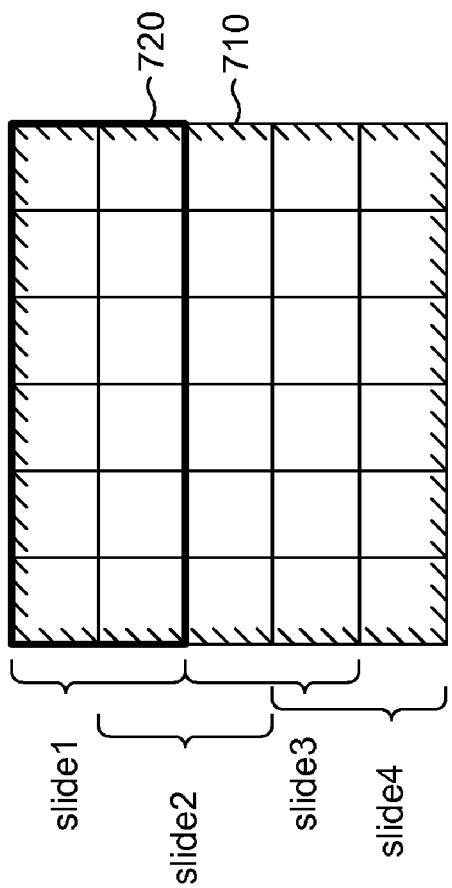
FIG. 7 illustrates another method of the present invention using a MSR and an ADB of certain size and shape and processing the MBs in another defined order.

FIG. 7 illustrates a case where the reference frame is ordered into four row processing and the ADB is a 5 (M−1+m) by 6 (N−1+n) block where the MSR is 2 (m) by 6 (n). The MSR can be slid four different times in vertical direction to process the data in the ADB. Here, M=4, and N=1. In this case, each pipeline stage has access to coding information up to 5 pipeline stages before from the top-left MB(s). Depending on the application, this method may be more useful than the one illustrated by FIG. 4 since more information will be available from the left and top-left MBs.

Figure 8:
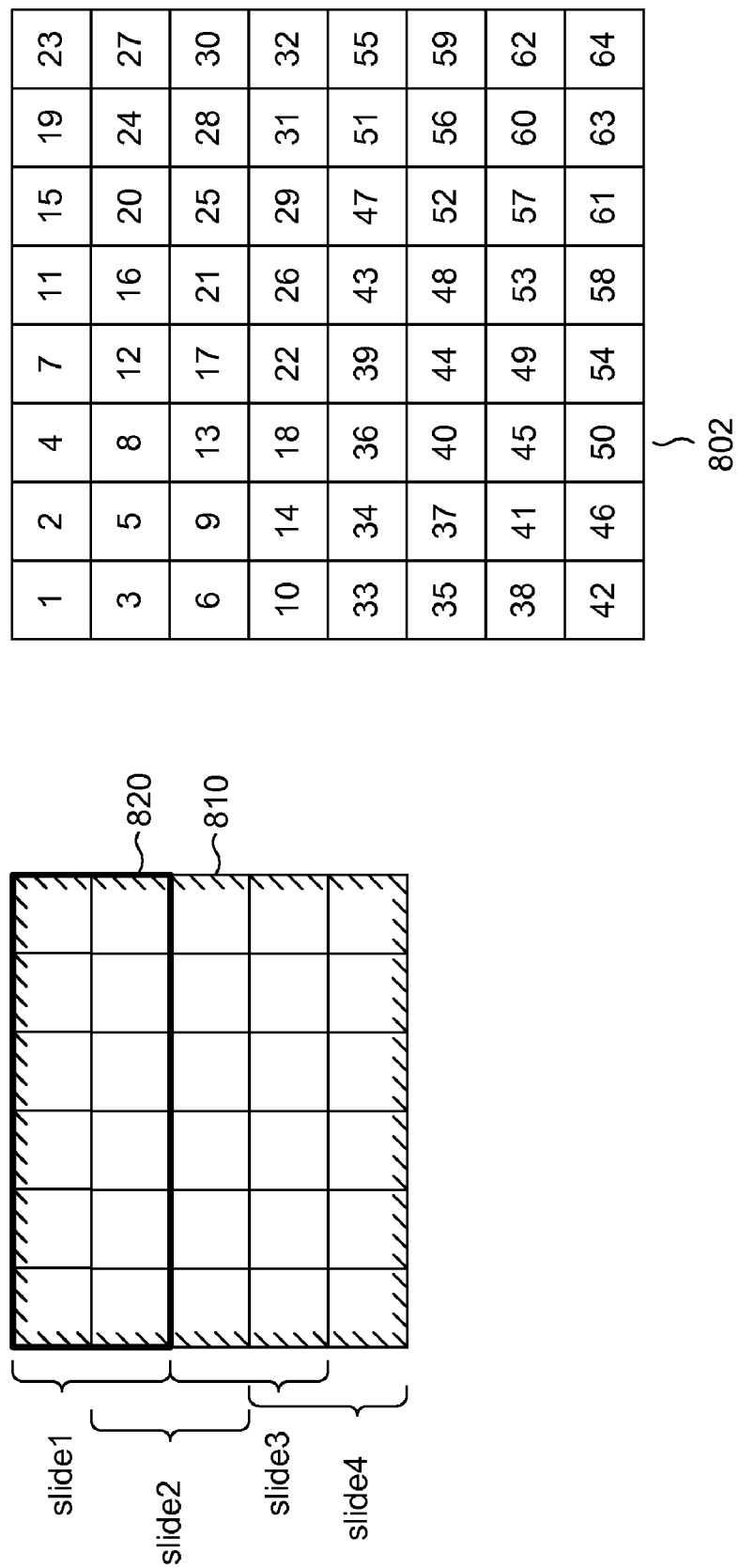
FIG. 8 illustrates another method of the present invention using a MSR and an ADB of certain size and shape and processing the MBs in a diagonal manner.

In another embodiment, referring to FIG. 8, the reference frame 802 is ordered in a diagonal order and the processing of the MBs proceeds in a diagonal fashion. In this case, for most MBs, information of top MB is 5 stages before, left MB 4 stages before, top-left 9 stages before, and top-right MB for previous stage. Although the ADB can be fashioned in a diagonal order, simple reordering at the ADB level allows the ADB to be in a rectangular shape, which conforms to memory layouts.

Figure 9:
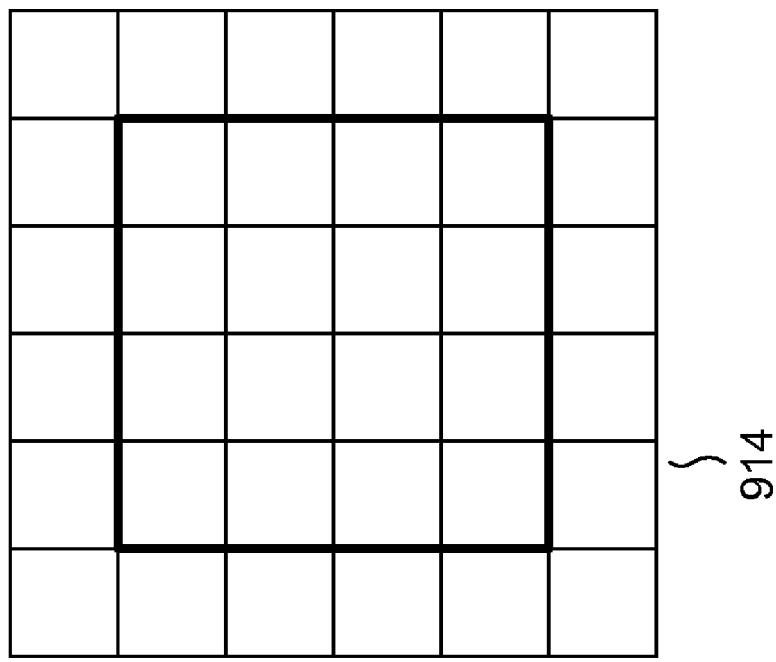
FIG. 9 illustrates other possible MSRs and ADBs.
Figure 9:
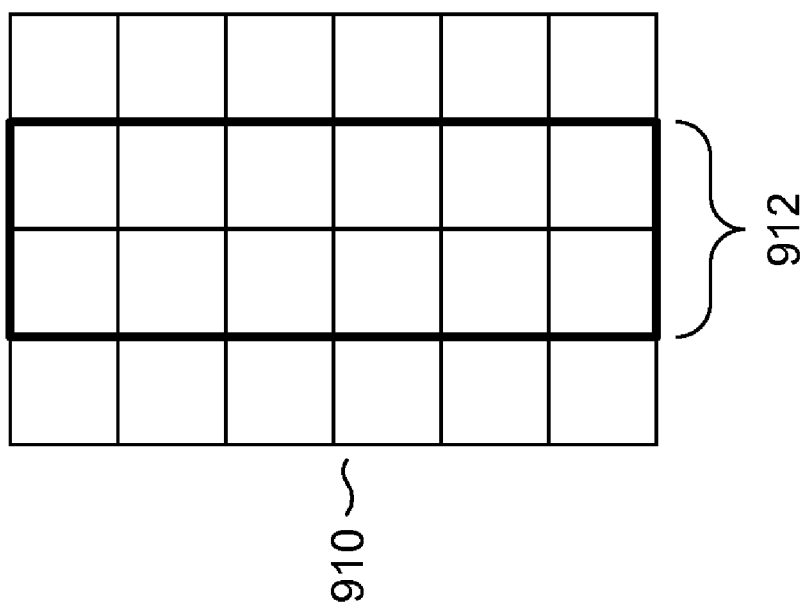

FIG. 9 illustrates a few other possible variations of the ADB and MSR combinations. At 910, the ADF is a 6×4 block where the MSR processed are indicated at 912. At 914, the ADF is a 6×6 square and the MSR to be processed is an inner 4×4 square. Other variations of the combination of the ADF and MSR are possible as well and can be designed according to the particular applications. For example, ADBs and MSRs with irregular shapes.

Note that although the processing has been described in terms of a current frame and a reference frame, it is important to note that the methods of the present invention is applicable to any two frames of data. There need not be a current frame or reference frame and they can be referred to as a first data frame and a second data frame.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

I claim:

1. A machine-implemented method for processing a first data frame in an external memory against a second data frame in the external memory, wherein the first data frame and the second data frame are divided into a plurality of blocks, comprising:
    ordering the blocks of the second data frame into a pre-defined order;
    defining an addressable data block (ADB) in an on-chip memory over the first data frame;
    defining a motion search range (MSR) within the ADB;
    loading selected blocks of the first data frame from the external memory into the ADB in the on-chip memory;
    loading one or more blocks of the second data frame from the external memory in the pre-defined order; and
    processing, with a chip, the one or more blocks of the second data frame against the selected blocks of the first data frame in the MSR, where the size of the MSR and the size of the ADB are defined as a function of the data transfer bandwidth between the on-chip memory and the external memory.

2. The method of claim 1 further comprising the steps of: while there are unprocessed blocks of the first data frame defined in the ADB, re-defining the MSR within the ADB; and processing the one or more blocks of the second data frame against the selected blocks of the first data frame in the MSR.

3. The method of claim 2 further including the steps of: repeating the defining an ADB step, the defining a MSR step, the loading steps, and the processing step of claim 1 and the while condition of claim 2.

4. The method of claim 3 wherein in repeating the defining an ADB step, the ADB is refined over the blocks of the first data frame in the direction of the pre-defined order.

5. The method of claim 2 wherein in the re-defining step, the MSR is re-defined in the direction of the unprocessed blocks of the first data frame.

6. The method of claim 1 wherein the MSR is defined having a size of m by n and the additional numbers of blocks to load at any one time into the ADB is M−1 in the vertical direction and N−1 in the horizontal direction, the method further comprising defining the size of the ADB to (M−1+m) by (N−1+n).

7. The method of claim 1 where the size of the ADB is a function of the size of the on-chip memory.

8. The method of claim 1 where the size of the MSR is a function of coding performance.

9. The method of claim 1, wherein the MSR is a subset of the ADB.

10. The method of claim 1, wherein the pre-defined order of the blocks of the second data frame is a function of the amount of information of processed neighbouring blocks available to the processing of the current block.

11. The method of claim 1, wherein the pre-defined order of the blocks of the second data frame is a function of performance of the processing.

12. A machine-implemented method for processing a first data frame in an external memory against a second data frame in the external memory, wherein the first data frame and the second data frame are divided into a plurality of blocks, comprising:
  ordering the blocks of the second data frame into a pre-defined order;
  defining an addressable data block (ADB) in an on-chip memory over the first data frame;
  defining a motion search range (MSR) within the ADB;
  loading selected blocks of the first data frame from the external memory into the ADB in the on-chip memory;
  loading one or more blocks of the second data frame from the external memory in the pre-defined order;
  processing, with a chip, the one or more blocks of the second data frame against the selected blocks of the first data frame in the MSR;
  while there are unprocessed blocks of the first data frame in the ADB, re-defining the MSR within the ADB; and processing the one or more blocks of the second data frame against the selected blocks of the first data frame in the MSR; and
  repeating the defining an ADB step, the defining a MSR step, the loading steps, the processing step, and the while step, where the size of the MSR and the size of the ADB are defined as a function of the data transfer bandwidth between the on-chip memory and the external memory.

13. The method of claim 12 wherein in repeating the defining an ADB step, the ADB is refined over the blocks of the first data frame in the direction of the pre-defined order.

14. The method of claim 12 wherein in the re-defining step, the MSR is re-defined in the direction of the unprocessed blocks of the first data frame.

15. The method of claim 12 wherein the MSR is defined having a size of m by n and the additional numbers of blocks to load at any one time into the ADB is M−1 in the vertical direction and N−1 in the horizontal direction, the method further comprising defining the size of the ADB to (M−1+m) by (N−1+n).

16. The method of claim 12 where the size of the ADB is a function of the size of the on-chip memory.

17. The method of claim 12 where the size of the MSR is a function of coding performance.

18. A machine-implemented method for processing a first data frame in an external memory against a second data frame in the external memory, wherein the first data frame and the second data frame are divided into a plurality of blocks, comprising:
  ordering the blocks of the second data frame into a pre-defined order;
  defining an addressable data block (ADB) in an on-chip memory over the first data frame;
  defining a motion search range (MSR) within the ADB;
  loading selected blocks of the first data frame from the external memory into the ADB in the on-chip memory;
  loading one or more blocks of the second data frame from the external memory in the pre-defined order;
  processing, with a chip, the one or more blocks of the second data frame against the selected blocks of the first data frame in the MSR;
  while there are unprocessed blocks of the first data frame in the ADB, re-defining the MSR within the ADB; and processing the one or more blocks of the second data frame against the one or more blocks of the first data frame in the MSR; and repeating the defining an ADB step, the defining a MSR step, the loading steps, the processing step, and the while step;
  wherein the MSR is defined having a size of m by n and the additional numbers of blocks to load at any one time into the ADB is M−1 in the vertical direction and N−1 in the horizontal direction, and
  the size of the ADB is defined as (M−1+m) by (N−1+n), where the size of the MSR and the size of the ADB are defined as a function of the data transfer bandwidth between the on-chip memory and the external memory.

19. A machine for processing a first data frame in an external memory against a second data frame in the external memory, wherein the first data frame and the second data frame are divided into a plurality of blocks, the machine comprising:
  an on-chip memory;
  a chip communicatively coupled to the on-chip memory;
  wherein the machine is configured to perform the steps of:
    ordering the blocks of the second data frame into a pre-defined order;
    defining an addressable data block (ADB) in the on-chip memory over the first data frame;
    defining a motion search range (MSR) within the ADB;
    loading selected blocks of the first data frame from the external memory into the ADB in the on-chip memory;
    loading one or more blocks of the second data frame from the external memory in the pre-defined order; and
    processing, with a processor, the one or more blocks of the second data frame against the selected blocks of the first data frame in the MSR, where the size of the MSR and the size of the ADB are defined as a function of the data transfer bandwidth between the on-chip memory and the external memory.

* * * * *